US008159840B2

(12) United States Patent
Yun

(10) Patent No.: US 8,159,840 B2
(45) Date of Patent: Apr. 17, 2012

(54) MULTILEVEL INVERTER

(75) Inventor: Hong Min Yun, Ulwang-si (KR)

(73) Assignee: LS Industrial Systems Co., Ltd., Anyang-Si, Gyeonggi-Do (KR)

( * ) Notice: Subject to any disclaimer, the term of this patent is extended or adjusted under 35 U.S.C. 154(b) by 471 days.

(21) Appl. No.: 12/407,159

(22) Filed: Mar. 19, 2009

(65) Prior Publication Data

US 2009/0237962 A1 Sep. 24, 2009

(30) Foreign Application Priority Data

Mar. 20, 2008 (KR) ........................ 10-2008-0025967

(51) Int. Cl.
*H02M 1/12* (2006.01)
*H02M 5/40* (2006.01)

(52) U.S. Cl. ................. 363/39; 363/37; 363/40; 363/44

(58) Field of Classification Search .............. 363/34–37, 363/39–43
See application file for complete search history.

(56) References Cited

U.S. PATENT DOCUMENTS

| | | | | |
|---|---|---|---|---|
| 6,972,972 | B2 * | 12/2005 | Duncan et al. | 363/56.01 |
| 7,872,888 | B2 * | 1/2011 | Kuzumaki et al. | 363/98 |
| 2010/0328883 | A1 * | 12/2010 | Ledezma et al. | 361/690 |

FOREIGN PATENT DOCUMENTS

| | | |
|---|---|---|
| CN | 1129371 | 8/1996 |
| CN | 101039094 | 9/2007 |
| JP | 2000-243636 | 9/2000 |
| JP | 2002-071869 | 3/2002 |
| JP | 2002-199744 | 7/2002 |
| JP | 2004-289985 | 10/2004 |
| JP | 2006-166654 | 6/2006 |
| JP | 2007-181355 | 7/2007 |
| JP | 2008-043012 | 2/2008 |
| KR | 1020010060453 | 7/2001 |
| KR | 1020050086278 | 8/2005 |

* cited by examiner

*Primary Examiner* — Jessica Han

(74) *Attorney, Agent, or Firm* — Lee, Hong, Degerman, Kang & Waimey

(57) ABSTRACT

The present invention relates to a multilevel inverter comprising: a converter unit converting an inputted AC power source to a direct current (DC) power source; a film capacitor rectifying the DC power source converted by the converter unit; an inverter unit converting the rectified DC power source to a three-phase current in response to a pulse width modulation (PWM) control signal and outputting the current; a current detector detecting a current outputted from the inverter unit; a power cell main controller generating a voltage instruction and a voltage instruction using the detected current; and a PWM controller generating the pulse width modulation (PWM) control signal using the voltage instruction and frequency instruction.

6 Claims, 2 Drawing Sheets

MULTILEVEL INVERTER

CROSS-REFERENCE TO RELATED APPLICATION

The present application is based on, and claims priority from, Korean Application Number 10-2008-0025967, filed Mar. 20, 2008, the disclosure of which is incorporated by reference herein in its entirety.

BACKGROUND

The present disclosure relates to a multilevel inverter capable of replacing a chemical capacitor with a film capacitor.

In general, a large high voltage induction motor is variably designed with voltages ranging from 2,400v to 7,200v, while a high voltage inverter which is a variable speed motor device suffers from drawbacks such as increased cost, need of wide area for installation and decreased system efficiency due to application to various motors using separate step-up and step-down transformers and also due to lack of variable voltages. The high voltage inverter also suffers from drawbacks such as harmonic influence on bus, motor burnt-out and vibration caused by pulse width modulation voltage.

Various kinds of multilevel inverters have been developed to overcome the drawbacks, and one of the power topologies showing the most excellent characteristics in terms of input/output quality is an H-bridge multilevel inverter. The H-bridge multilevel inverter generally a multilevel inverter using a cascade configuration which is a multilevel topology of a high voltage and large capacity inverter, in which several single phase inverters (hereinafter, referred to as power cells or cells) are connected in series for each phase of a three-phase current and accordingly a high voltage can be obtained by using low voltage power semiconductor switches within the power cells. Thus, the H-bridge multilevel inverter is called a cascade inverter.

The H-bridge multilevel inverter using a cascade configuration has a feature of a pulse width modulation/phase shift wherein a phase difference is sequentially generated between power cells which are serially connected to one another. Accordingly, the H-bridge multilevel inverter can have a low rate of output voltage change (dv/dt). In addition, the multilevel inverter using the cascade configuration can obtain reduced total harmonic distortion (THD) due to an output voltage with multi levels, namely, many steps.

Further, the H-bridge multilevel inverter using the cascade configuration rarely incurs a voltage reflection. Accordingly, in spite of a long distance between the multilevel inverter using the cascade configuration and a motor, there is no need for a separate device to prevent the voltage reflection phenomenon.

Unlike other multilevel inverters, the H-bridge multilevel inverter has advantages such as no issues of voltage imbalance between DC-link capacitors and easy extension to a desired output voltage by modularization.

FIG. 1 is a circuit diagram illustrating a configuration of a conventional H-bridge multilevel inverter system.

Referring to FIG. 1, the H-bridge multilevel inverter system consists of a plurality of power cells 2 each connected in series, where the plurality of single phase power cells 2 are connected in series for each phase of a three-phase current and each power cell 2 has an independent single phase inverter structure. An input unit connected to a power system is a transformer 6 having several tabs of extended delta connection method at a secondary wiring side.

FIG. 2 is a circuit diagram illustrating configuration of power cell of the conventional H-bridge inverter.

Referring to FIG. 2, the H-bridge inverter comprises: an input alternating current (AC) power source 10; a converter unit 11 converting the inputted AC power source to a direct current (DC) power source; an initial charging resistor 12 preventing an inflow of a rush current during input of the inputted AC power source; an electronic contactor 13 separating the initial charging resistor 12 from the circuit following the prevention of the rush current; a chemical capacitor 14 rectifying a DC voltage; an inverter unit 15 converting the inputted DC power source in response to a pulse width modulation (PWM) control signal; a current detector 16 detecting a current outputted from the inverter unit 15; a power cell main controller 17 collecting various information including a three-phase current and the DC voltage of the inverter unit 15 and exchanging various instructions and information with a master controller (17. not shown); and a PWM controller 18 receiving voltage instruction and frequency instruction from the power cell main controller 17 to generate a pulse width modulation (PWM) control signal.

Each power cell of the convention H-bridge inverter is equipped with the chemical capacitor 14. The chemical capacitor 14 is an essential constituent element having a direct influence on the life of the inverter, such that the chemical capacitor 14 should be carefully chosen as it affects greatly on a current ripple rate and ambient temperature.

In general, the chemical capacitor 14 functions in the following manner. That is, the chemical capacitor 14 serves to compensate an instantaneous difference between an input power and an output power for each power cell unit, to compensate an output using an energy of the chemical capacitor 14 for a predetermined time period during instantaneous black-out, and functions to store a regenerative energy when the regenerative energy is generated.

However, the high-voltage inverter system which is a single phase output inverter system suffers from a drawback of being installed with more numbers of capacitors than those of the three phase output inverter, thereby increasing the overall size of the entire system.

The chemical capacitor 14 has a high volume capacitance, where a current inputted into a DC terminal generally shows a rabbit ear-shaped discontinuous current, which is a cause of generating harmonics.

Still another drawback of the chemical capacitor 14 is that circuits associated with initial charging, for example, circuits such as initial charging resistor 12 and electronic contactor 13, are additionally required.

SUMMARY

Therefore, it is an object of the present invention to provide a multilevel inverter, the inverter comprising: a converter unit converting an inputted AC power source to a direct current (DC) power source; a film capacitor rectifying the DC power source converted by the converter unit; an inverter unit converting the rectified DC power source to a three-phase current in response to a pulse width modulation (PWM) control signal and outputting the current; a current detector detecting a current outputted from the inverter unit; a power cell main controller generating a voltage instruction and a voltage instruction using the detected current; and a PWM controller generating the pulse width modulation (PWM) control signal using the voltage instruction and frequency instruction.

The multilevel inverter may further comprise an input transformer, where the input transformer has several tabs at a secondary wiring side by way of zigzag connection or an extended delta connection, and an output power source of the input transformer is inputted into the input AC power source.

The inverter unit may include one of the elements out of metal oxide field effect transistors (MOSFET), insulated gate bipolar transistors (IGBT) and gate turn-off (GTO) thyristors. The inverter unit may further include a phase shift transformer, where an output power source of the phase shift transformer is inputted to the input AC power source. The phase shift transformer may include an inductor having a predetermined inductance value, where relation between the predetermined inductance value and the capacitance value of film capacitor is set at 1:3.

DETAILED DESCRIPTION

The multilevel inverter according to the present invention will be described in detail with reference to FIG. 3.

In describing the present disclosure, detailed descriptions of constructions or processes known in the art may be omitted to avoid obscuring appreciation of the invention by a person of ordinary skill in the art with unnecessary detail regarding such known constructions and functions. Particular terms may be defined to describe the invention in the best mode as known by the inventors. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 1:
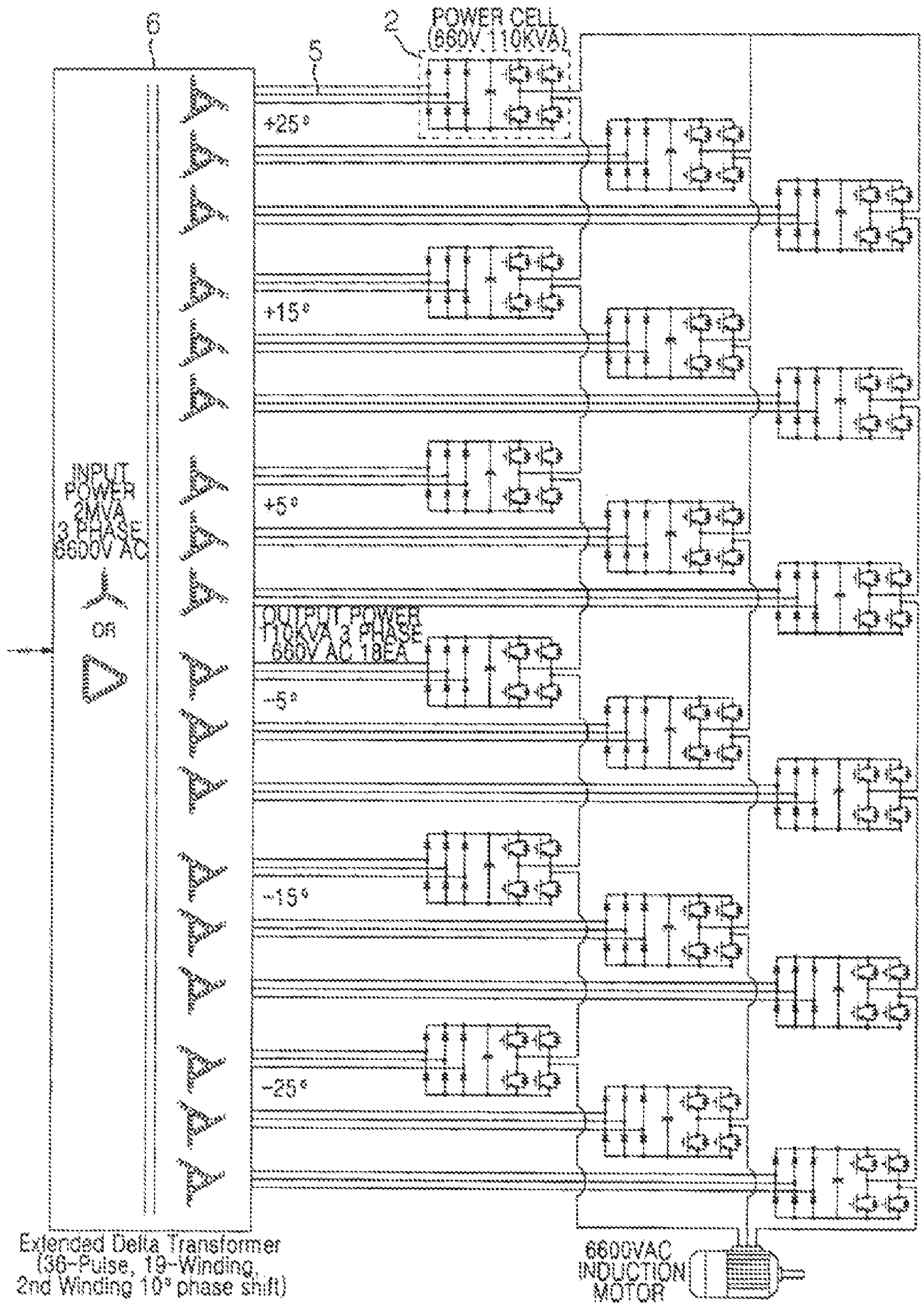
FIG. 1 is a circuit diagram illustrating a configuration of a conventional H-bridge multilevel inverter system.
Figure 2:
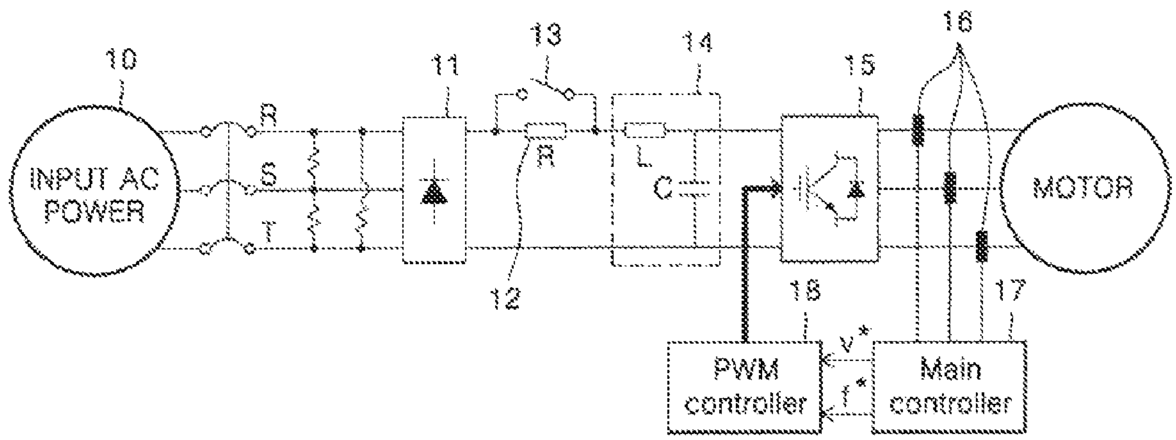
FIG. 2 is a circuit diagram illustrating configuration of a power cell of the conventional H-bridge inverter.
Figure 3:
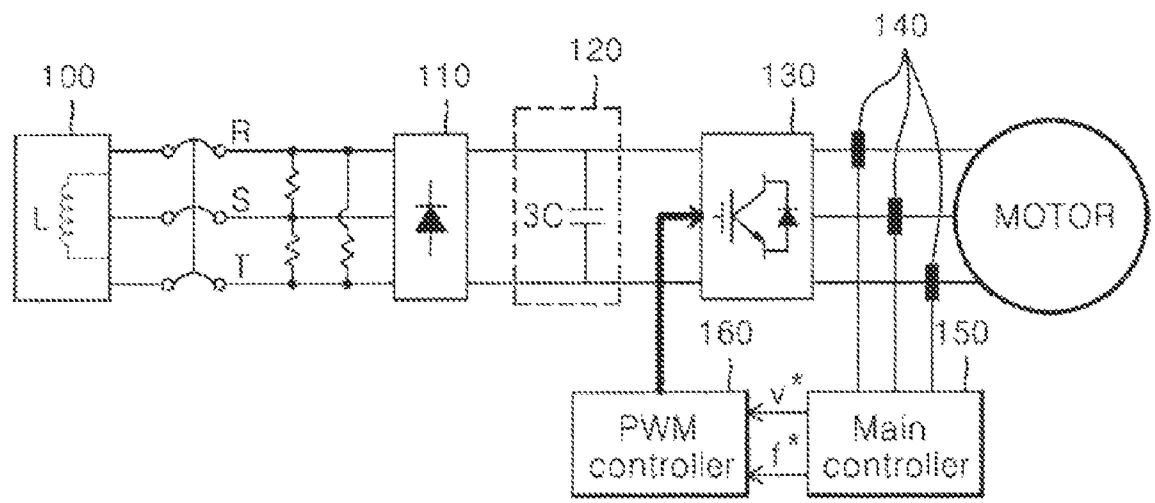
FIG. 3 is a circuit diagram illustrating a configuration of each power cell in a multilevel inverter according to an exemplary embodiment of the present invention.

FIG. 3 is a circuit diagram illustrating a configuration of each power cell in a multilevel inverter according to an exemplary embodiment of the present invention.

Referring to FIG. 3, the multilevel inverter may include an input AC power source 100, a converter unit 110, a film capacitor 120, an inverter unit 130, a current detector 140, a power cell main controller 150, and a PWM controller.

The input AC power source 100 is inputted by a secondary side output of an input transformer (not shown). The input transformer may be employed for two usages. First, the input transformer serves to supply an independent power source to each power cell of an H-bridge multilevel inverter. Second, the input transformer generates a phase difference between secondary side tabs to form a rectifier type converter of multipulse method, whereby a low total harmonic distortion (THD) can be obtained at an input terminal. The input transformer may be formed at the secondary wiring side with several tabs using extended delta connection or zigzag connection.

An input transformer connectible to the input AC power source 100 may use a phase shift transformer. The phase shift transformer may further include an inductor having a predetermined inductance value. Inductance value of the inductance and capacitance value of the film capacitor may be adjusted to improve a total harmonious distortion (THD) of an input terminal. For example, relation between the inductance value and the capacitance value of the film capacitor may be set up at 1:3.

The converter unit 110 serves to convert to a DC power source the AC power source inputted from the input AC power source 100. The film capacitor 120 functions to rectify the DC power source converted by the converter unit 110.

The inverter unit 130 functions to convert the inputted DC power source to a three-phase AC in response to a PWM control signal and output the three-phase AC. The inverter unit 130 may be comprised of the most common switching elements for output voltage control such as metal oxide field effect transistors (MOSFET), insulated gate bipolar transistors (IGBT) and gate turn-off (GTO) thyristors. A harmonic cut-off frequency by switching at inverter terminal may be determined within a scope of ⅕ to ½ of the switching frequency employed by the inverter. That is, the switching frequency may be designed based on 1 kHz, and the harmonic cut-off frequency by the switching at the inverter terminal may be 200 Hz to 500 Hz when the aforementioned switching is employed. The cut-off frequency (wc) may be set up as per the following equation, and the capacitance value may be determined in consideration of inductance value of input transformer according to cut-off frequency value.

$$\omega_c = \frac{1}{\sqrt{3L_f C_f}}$$

$$R_f = \omega_c L_f$$

The current detector 140 serves to detect the current of each phase outputted from the inverter unit 130 and transmit the current to the power cell main controller 150. The power cell main controller 150 functions to receive various information including the DC voltage inputted from the inverter unit 130 and the phase current outputted from the inverter unit 130 and exchange various instructions and information for various operation control with a master controller (not shown). The PWM controller 160 serves to receive voltage instruction and frequency instruction from the power cell main controller 150 to generate a pulse width modulation (PWM) waveform corresponding thereto and output a PWM control signal to the inverter unit 130. The multilevel inverter according to the present invention is characterized in that it may use a film capacitor instead of the chemical capacitor as a capacitor of each power cell.

In a case of using the film capacitor, a characteristic equation useable by the power cell main controller 150 and the PWM controller 160 for power stabilization at the DC power source may be given as under:

$$\begin{bmatrix} \frac{d\tilde{i}_c}{dt} \\ \frac{d\tilde{v}_c}{dt} \end{bmatrix} = \begin{bmatrix} -\frac{\left(R_s R_f + \frac{L_f}{C_f}\right)}{(L_s R_f + R_s L_f + R_f L_f)} & -\frac{R_f + L_f\left(\frac{\overline{P} - k\overline{v}_c^2}{c\overline{v}_c^2}\right)}{(L_s R_f + R_s L_f + R_f L_f)} \\ \frac{1}{c} & \frac{\overline{P} - k\overline{v}_c^2}{c\overline{v}_c^2} \end{bmatrix} \begin{bmatrix} \tilde{i}_c \\ \tilde{v}_c \end{bmatrix}$$

Use of film capacitor may be so designed as to allow the power detection and current control method to be robust to dynamic characteristic, and to be sensitive to input power change.

Now, the advantage of using the film capacitor instead of chemical capacitor as a capacitor of each power cell will be described.

First, the volume of the multilevel inverter may be reduced. The film capacitor has an approximate size ⅓ that of the chemical capacitor to thereby reduce the volume occupied by a capacitor in the multilevel inverter. As a result, the volume of the multilevel inverter can be reduced. Furthermore, the film capacitor is less expensive and has a longer life over that of the chemical capacitor.

Second, a charging circuit of an input terminal may be omitted. The film capacitor having a small capacity can be charged within a short time period, whereby there is no requirement of installing an initial charging resistor or an electronic contactor at the input terminal.

Third, reliability of multilevel inverter system can be enhanced. The film capacitor makes it possible to dispense with an input terminal charging circuit, such that the multilevel inverter is not affected by the input terminal charging circuit to enhance the reliability of the multilevel inverter system.

Fourth, a rush current can be reduced during charging. The film capacitor having a small capacity can greatly reduce the rush current during the charging compared with a case where the chemical capacitor is utilized. Thus, a safety of the multilevel inverter system can be increased during input of an initial power source to obtain an excellent harmonic characteristic.

If a system applied with a high voltage inverter is a light load system taking no stock of an overload rate, the system is preferred to use a film capacitor instead of a chemical capacitor. The light load system uses a voltage and frequency constant control method as a control method, and is hardly affected by sudden changes of load. The light load system is capable of implementing an automatic re-start even if an instantaneous black-out occurs or regenerative braking is not operated.

There is an advantage in the multilevel inverter according to the present disclosure in that an entire volume of the multilevel inverter can be reduced by using a film capacitor having a smaller size than that of a chemical capacitor. Other advantages are that use of a film capacitor having a small capacity can remove an input terminal charging circuit, and greatly reduce the rush current during charging to enhance the reliability and safety of the multilevel inverter.

Still furthermore, the multilevel inverter system may be dispensed with an initial charging circuit and a separate rectification circuit inductor by using the phase shift transformer. At the same time, the total harmonious distortion (THD) of input current at the rectifier terminal may be improved.

As the present invention may be embodied in several forms without departing from the characteristics thereof, it should also be understood that the above-described embodiments are not limited by any of the details of the foregoing description, unless otherwise specified, but rather should be construed broadly within the scope as defined in the appended claims, and therefore all changes and modifications that fall within the metes and bounds of the claims, or equivalents of such metes and bounds are therefore intended to be embraced by the appended claims.

What is claimed is:

1. A multilevel inverter, comprising:
- a converter unit configured for converting an input alternating current (AC) power source to a direct current (DC) power source;
- a film capacitor configured for rectifying the DC power source;
- an inverter unit configured for:
  - converting the rectified DC power source to a three-phase current in response to a pulse width modulation (PWM) control signal; and
  - outputting the current;
- a current detector configured for detecting the current output from the inverter unit;
- a power cell main controller configured for generating a voltage instruction and a frequency instruction using the current detected by the current detector;
- a PWM controller configured for generating the PWM control signal using the voltage instruction and frequency instruction; and
- a phase shift transformer configured for outputting power to the input AC power source,
- wherein the phase shift transformer has a predetermined inductance value, and
- wherein a relation between the predetermined inductance value of the phase shift transformer and a capacitance value of the film capacitor is 1:3.

2. The multilevel inverter of claim 1, further comprising an input transformer, configured for outputting a power source to the AC power source, the input transformer having a plurality of tabs at a secondary wiring side using a zigzag connection or an extended delta connection.

3. The multilevel inverter of claim 2, wherein the inverter unit includes one selected from the group consisting of metal oxide field effect transistors (MOSFET), insulated gate bipolar transistors (IGBT) and gate turn-off (GTO) thyristors.

4. The multilevel inverter of claim 1, wherein the inverter unit includes one selected from the group consisting of metal oxide field effect transistors (MOSFET), insulated gate bipolar transistors (IGBT) and gate turn-off (GTO) thyristors.

5. The multilevel inverter of claim 1, wherein a harmonic cut-off frequency by switching at the inverter unit is within a scope of ⅕ to ½ of a switching frequency utilized by the inverter unit.

6. The multilevel inverter of claim 5, wherein the harmonic cut-off frequency by the switching at the inverter unit is 200 Hz to 500 Hz when the switching frequency is 1 kHz.

* * * * *